Jan. 20, 1970  S. H. UPDIKE ET AL  3,490,428
VALVE STEM OIL SHIELD
Filed Jan. 5, 1968
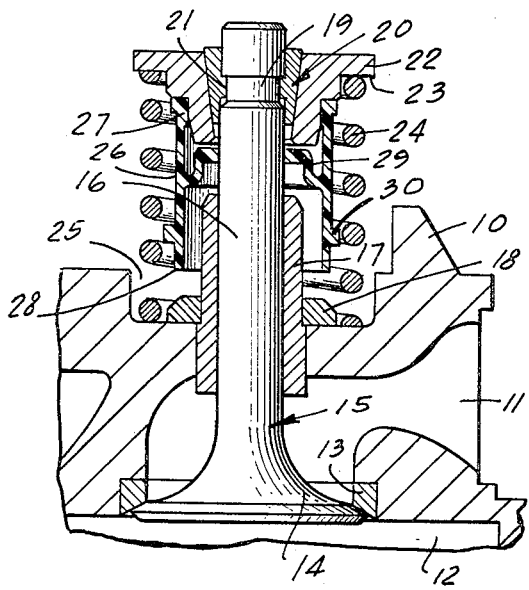
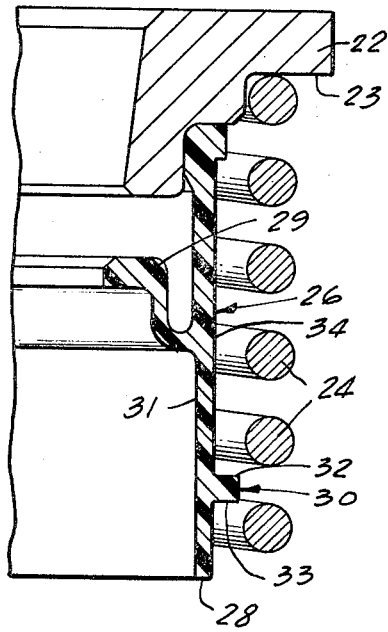
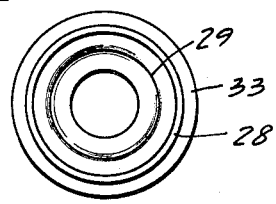
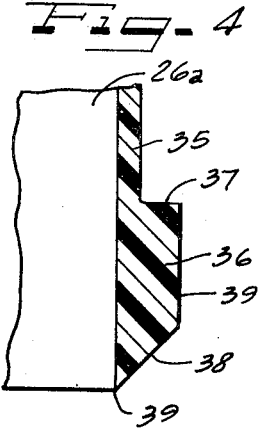
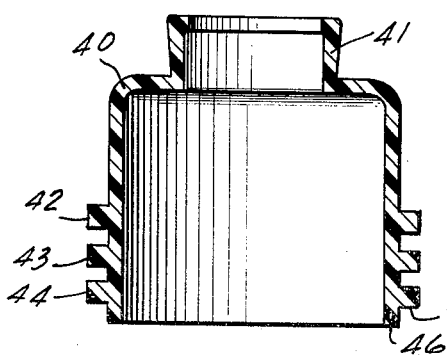
INVENTORS
STANLEY H. UPDIKE
WILLIAM A. MICHAELS
BY *(signature)* ATTORNEYS

United States Patent Office 3,490,428
Patented Jan. 20, 1970

3,490,428
VALVE STEM OIL SHIELD
Stanley H. Updike, Mentor, and William A. Michaels, Warrensville Heights, Ohio, assignors to TRW Inc., Cleveland, Ohio, a corporation
Filed Jan. 5, 1968, Ser. No. 695,924
Int. Cl. F01l 3/08
U.S. Cl. 123—188        7 Claims

ABSTRACT OF THE DISCLOSURE

A valve stem oil shield for use in connection with the poppet valve stems of internal combustion engines which has a radially extending continuous external surface interruption or dam therearound which may consist of one or more radially extending rings of integral material encircling the exterior wall of the shield or which may in another embodiment be a radially thickened portion presenting a circumferential radial shoulder around the exterior surface and which in all embodiments is located below the axial mid-point of the shield and above the bottom thereof. The shield is designed for attachment to the reciprocating valve assembly. The oil accumulating on the dam will be thrown off exteriorly of the oil shield by the reciprocating movement of the valve assembly.

BACKGROUND OF THE INVENTION

Field of the invention

This invention relates to oil shields for use in connection with poppet valves of an internal combustion engine and more particularly to a tortuous path external surface interruption encircling the oil shield and integral with the shield to increase the oil saving capabilities of the shield.

Prior art

Valve stem oil shields for use in connection with reciprocating valves of internal combustion engines are known in the art as for example in the W. S. Giles U.S. Patent No. 3,110,298 issued Nov. 12, 1963. Such prior art oil shields are designed to depend from the valve spring retainer in radially spaced encircling relationship to the valve stem and the valve stem guide. Due to the reciprocating motion of the poppet valve, the oil shields terminate in spaced relation from the engine block.

The purpose of such oil shields is to prevent an excess amount of oil from coming into contact with the valve stem and thereafter running down the stem into the valve port or cylinder bore where it may be consumed and form excess carbon deposits. Although such prior art oil shields are effective to decrease oil consumption to a certain degree that have disadvantages in that oil which is splashed onto the exterior of the oil shield can run down the sides of the oil shield and be thrown up into the interior of it during reciprocation of the poppet valve assembly. Such excess oil when thrown up interiorly of the shield can then run down the valve stem into the valve port or cylinder bore.

SUMMARY

The present invention avoids the deficiencies of the prior art valve stems by providing a tortuous path exterior surface on the valve shield which exterior surface provides a radial shoulder or dam encircling the valve shield on which oil may be accumulated above the bottom of the oil shield and thereafter be thrown off exteriorly of the oil shield by the reciprocating movement of the valve assembly.

In one embodiment of this invention the external surface interruption takes the form of one or more radially extending rings encircling the shield. The rings are integral with the shield and are positioned between the mid-point of the shield and the bottom of the shield. In another embodiment of this invention the external interruption takes the form of a radially thickened bottom portion of the shield having a radial shoulder at the top thereof and a frusto-conically angled bottom portion. In this embodiment the shoulder is also located below the mid-point of the shield and above the bottom thereof.

It is therefore an object of this invention to provide a one-piece oil shield having an external surface interruption therearound for use in connection with the valves of an internal combustion engine.

It is a further object of this invention to provide a one-piece oil shield having an external surface radial interruption therearound positioned below the axial mid-point of the shield and above the bottom thereof for increased oil control.

It is a further and more specific object of this invention to provide a one-piece oil shield for use in connection with the valves of internal combustion engines which has a radially projecting continuous integral ring positioned below the axial mid-point and above the bottom of the shield and encircling the exterior surface thereof.

It is yet another and more specific object of this invention to provide an oil shield for use in connection with valve assemblies in internal combustion engines which has an external surface interruption therearound located below the axial mid-point of the shield and above the bottom thereof and which presents a radial shoulder to provide a tortuous path for the flow of oil downwardly along the exterior surface of the shield and an accumulation point from which oil may be thrown off exteriorly of the oil shield.

BRIEF DESCRIPTION OF THE DRAWINGS

FIGURE 1 is a vertical sectional view taken through the head of an engine and illustrating valve assembly employing an oil shield embodying the principles of the present invention;

FIGURE 2 is a fragmentary vertical expanded view taken through the upper end of a valve assemly with portions omitted and illustrating an oil shield embodying the principles of this invention;

FIGURE 3 is a bottom plan view of the oil shield of FIGURES 1 and 2;

FIGURE 4 is a fragmentary cross-sectional view of the bottom of an oil shield illustrating another embodiment of this invention;

FIGURE 5 is a cross-sectional view of another type of oil shield illustrating yet another embodiment of this invention.

DESCRIPTION OF THE PREFERRED EMBODIMENTS

FIGURE 1 illustrates a valve assembly for an internal combustion engine with the view showing a portion of an engine head 10 in cross-section. The engine head has a valve port 11 therein communicating to a cylinder bore 12. The opening of the valve port 11 to the cylinder bore 12 has a valve seat 13 therearound against which the head 14 of a poppet valve 15 seats to close the valve port 11.

The poppet valve 15 has a valve stem 16 which projects exteriorly of the engine head 10 through a valve guide 17 journalled through the engine head 10 and which terminates in the valve port 11. The valve stem guide 17 is held in place with respect to the engine head 10 by a retaining member 18 which encircles it and which bottoms on the engine head 10. At the upper end of the valve stem 16 an annular lock receiving groove 19 is provided. The groove receives a valve spring retainer lock 20 which has inwardly directed locking flanges 21 seated in the groove 19. The lock 20 holds a valve spring retainer 22 circumferentially around the end of the valve stem 16. The valve spring retainer 22 has a radial shoulder 23 therearound against which is seated one end of a coil spring 24. The other end of the coil spring 24 is seated in a recess 25 in the engine head 10. The recess 25 surrounds the valve stem guide 17.

During operation of the engine the poppet valve 15 is reciprocatingly moved up and down at high speeds compressing and relaxing the coil spring 24. During this operation lubricating oil is splashed against the valve assembly. Excess amounts of this oil may run down along the exterior of the valve stem 16 through the valve stem guide 17 and then into the valve port 11 where it can combine with combustion gases of the engine to cause excessive smoking and carbon buildup. It is therefore desirable to maintain the oil on the valve stems 16 at the minimum required for effective lubrication.

For this purpose an oil shield 26 is provided which surrounds the valve stem 16 and the valve stem guide 17 and which depends from the valve spring retainer 22.

The valve stem oil shield 26 illustrated in FIGURE 1 is basically cylindrical having an upper portion 27 bonded to an exterior surface of the valve spring retainer and a bottom 28 which terminates a sufficient distance above the member 18 so as not to contact it when the valve 15 is forced downwardly into its open position. The shield 26 also has an internal integral cantilevered lip 29 which sealingly engages the valve stems 16.

The oil shield, inasmuch as it surrounds the valve stem and valve stem guide reduces the amount of oil which is splashed against the valve stem interiorly of the shield. However, oil which is splashed against the exterior of the shield can then run down the outside of the shield to the bottom thereof where, due to the reciprocating nature of the valve assembly, it can form into drops which are then thrown up interiorly of the oil shield against the valve stem. In order to prevent this from occurring the external surface of the oil shield is provided with an interruption which forms a collecting point for the oil film as it runs down the outside of the oil shield.

In the embodiment illustrated in FIGURES 1 and 2 the surface interruption takes the form of a ring 30 integral with the shield 26 which projects radially outwardly from the external cylindrical surface of the shield.

As best shown in FIGURE 2 the ring 30 consists of a radial projection integral with the cylindrical wall 31 of the shield 26. The ring 30 projects radially outwardly from the exterior surface of the cylindrical wall 31 to a point which is interior to the coil spring 24 so that the ring 30 does not contact the coil spring during operation of the valve assembly. It is desirable that the ring 30 extend radially as far as possible up to the limit of interference with the valve spring 24 inner diameter.

The ring 30 thus presents upper 32 and lower 33 radial shoulders extending outwardly from the cylindrical wall 31 of the shield 26. It can be seen that an oil film forming on the exterior surface 34 of the cylindrical wall 31 and tending to flow downwardly along that surface will be stopped by the radial shoulder 32. The oil film will then form into beads or droplets on the shoulder 32 and will be thrown off of the shoulder during reciprocal operation of the valve assembly. Inasmuch as the oil droplets thus formed are thrown off of the shield exteriorly thereof, the amount of oil contacting the valve stem is reduced.

In the embodiment illustrated in FIGURE 2 the ring 30 is spaced from the bottom 28 of the shield by a distance which is less than a quarter of the axial height of the shield. The placement of the ring axially on the shield is of importance. When the ring 30 is placed at the bottom end 28 of the shield oil particles which are thrown off of the shield 32 may be directed inside the shield at random where they can be ultimately lost. Spacing the ring 30 axially above the end 28 minimizes the ability of the oil particles to be thrown interiorly of the shield. However, when the ring is located mid-way between the shield ends or thereabove, the division of surface area decreases the efficiency of the ring inasmuch as the area below the ring is then great enough to collect sufficient oil such that quantities of oil particles still collect at the end of the shield and may thereafter be thrown interiorly of the shield.

In tests it was found that satisfactory results were received using a shield of the type shown in FIGURES 1 and 2 having an axial height of .910 inch when the bottom shoulder 33 was located .150 inch from the bottom 28 of the shield. In that test it was found that the average amount of oil lost per valve per hour in an eight cylinder engine run at a cam speed of 1500 r.p.m. was .35 cu. cm. With the ring 30 located at the bottom 28 of the shield the loss increased to 1.75 cu. cms. per valve hour under the same conditions. Further when the shoulder 33 of the ring was located .300 inch from the bottom, the loss was 1.6 cu. cms. per valve per hour. In another test using a shield like the shield shown in FIGURES 1 and 2 but without the ring 30 the loss was 3.3 cu. cms. per valve per hour. It is therefore, apparent that the ring is most advantageously located below the mid-point of the shield and preferably approximately one quarter of the axial length of the shield from the bottom thereof. In other words the ring should be located as close to the bottom of the shield as can be without allowing the oil droplets to be thrown interiorly of the shield.

FIGURE 4 illustrates another embodiment of the invention. In this embodiment the cylindrical wall 35 of the shield 26a has a bottom portion 36 which has a radial width greater than the radial width of the remainder of the wall 35. This increase in radial width creates a radial shoulder 37 at the top of the widened portion 36. The shoulder 37 acts in the same manner as the shoulder 32 of the embodiment shown in FIGURES 1 and 2. The bottom of the widened portion 36 terminates in a frustoconical taper 38 which tapers inwardly to the bottom 39 of the shield 26a. The taper 38 aids in directing all particles forming on the circumferential surface 39 of the widened portion 36 to be thrown off of the shield exteriorly of the shield. In this embodiment it is desirable that the shoulder 37 be spaced from the bottom 39 of the shield approximately the same distance that the shoulder 32 is spaced from the bottom 28 of the shield embodiment shown in FIGURES 1 and 2. It is also desirable that the width of the widened portion 39 be as great as possible up to the limit of interference with the valve spring inner diameter.

FIGURE 5 illustrates the multiple ring embodiment of this invention. The shield 40 illustrated in FIGURE 5 is of the type which has an axially projecting collar 41 at the top thereof sized to fit between the valve spring retainer and the valve stem of valve assembly to retain the shield 40 in place on one valve assembly.

In this modified form of the invention three rings 42, 43 and 44, which are each like the ring 30 shown in FIGURES 1 and 2, encircle the shield 40. In this instance, because of the provision of multiple rings, it is not necessary that the top ring 42 be positioned as far down the axial length of the shield as is the ring 30 of FIGURES 1 and 2. However, it is still necessary that the bottom ring 44 have its bottom radial shoulder 45 positioned above the bottom 46 of the shield 40 to minimize the possibility of oil being thrown interiorly of the shield.

Although the above described shields have all been cylindrical it is to be understood that our invention may be used with conical or other shaped oil shields.

It will then be understood from the above that our invention provides a valve assembly oil shield with increased oil saving abilities derived from the provision of one or more external surface interruptions which provide radial shoulders extending outwardly from the wall of the oil shield, which shoulders allow for the formation of oil droplets from the oil film normally forming on the exterior surface of the oil shield during use which droplets are thrown off exteriorly of the oil shield during operation of the assembly.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim:

1. An oil shield for use in connection wtih valve assemblies in internal combustion engines which comprises: a body portion having interior and exterior surfaces encircling a portion of a valve stem of the valve assembly; the exterior surface of said oil shield being substantially smooth; a surface interruption on the exterior surface of said oil shield encircling said oil shield, said surface interruption providing a dam projecting outwardly from said exterior surface to form a depositing point for oil droplets forming on said exterior surface, and said shield retained in position around said valve stem and movable therewith whereby the reciprocating action of the valve stem and shield throws off the oil droplets formed on said dam.

2. The oil shield of claim 1 wherein a plurality of said surface interruptions are provided on the said exterior surface of the said shield.

3. The oil shield of claim 1 wherein the surface interruption consists of a radially outwardly widened lower body portion and the dam is provided by a radial shoulder created by the top of said widened portion.

4. The oil shield of claim 3 wherein the bottom of said widened portion is frusto-conically tapered.

5. The oil shield of claim 1 wherein the surface interruption is spaced below the axial mid-point of the shield and above the bottom thereof.

6. An oil shield for use in connection with reciprocating valve assemblies of internal combustion engines which comprises: a body member designed for attachment to the valve assembly in encircling relationship to the stem of a valve for reciprocating therewith, the body member having interior and exterior surfaces, at least one radially extending ring projecting from the exterior surface integral with the shield and in encircling relationship therewith, said ring having a top surface forming a radial shoulder around said shield to provide a tortuous path for oil flowing down the exterior surface of the shield to cause the oil to collect on said shoulder whereby it may be thrown off said shoulder externally of said shield, said ring being spaced above the bottom of said shield and below the axial mid-point of said shield, said shield having a substantially cylindrical external surface except for said ring, the said ring having a bottom surface spaced from the annular bottom of said oil shield, and the external surface of the said oil shield intermediate the said annular bottom and the said bottom surface of the said ring having a diameter less than the outer diameter of the said ring.

7. In an oil shield for use in connection with valve assemblies having poppet valve stems with a valve spring retainer at one end thereof and a valve spring engaging the retainer and encircling the valve stem with the oil shield depending from the retainer and spaced between the valve stem and the valve spring and having a body portion encircling a portion of the valve stem, the improvement of: at least one external surface interruption on the said body portion extending radially outwardly from the said body portion to a point in close running clearance relationship to the internal diameter of said valve spring, said surface interruption providing a radially extending shoulder continuously encircling the said oil shield to provide a collecting point for oil flowing down the external surface of said body portion and said surface interruption spaced below the mid-point of said body portion and above the bottom thereof.

References Cited

UNITED STATES PATENTS

| | | |
|---|---|---|
| 2,821,973 | 2/1958 | Guhman. |
| 2,859,993 | 11/1958 | Estey. |
| 2,876,759 | 3/1959 | Duesenberg. |
| 3,110,298 | 11/1963 | Giles. |
| 3,171,659 | 3/1965 | Anderson et al. _____ 277—33 |
| 3,403,918 | 10/1968 | Liebig _____ 277—152 |

AL LAWRENCE SMITH, Primary Examiner

U.S. Cl. X.R.

123—90; 277—33, 152, 178